United States Patent
Campbell et al.

(10) Patent No.: US 9,898,376 B2
(45) Date of Patent: *Feb. 20, 2018

(54) RECOVERY OF A TRANSACTION AFTER XA END

(71) Applicant: International Business Machines Corporation, Armonk, NY (US)

(72) Inventors: Mark J. Campbell, Romsey (GB); Geoffrey M. Winn, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/186,568

(22) Filed: Jun. 20, 2016

(65) Prior Publication Data
US 2016/0292052 A1  Oct. 6, 2016

Related U.S. Application Data

(63) Continuation of application No. 14/552,971, filed on Nov. 25, 2014, now Pat. No. 9,400,719, which is a
(Continued)

(51) Int. Cl.
*G06F 11/00* (2006.01)
*G06F 11/14* (2006.01)
(Continued)

(52) U.S. Cl.
CPC .......... *G06F 11/1471* (2013.01); *G06F 9/466* (2013.01); *G06F 11/1417* (2013.01);
(Continued)

(58) Field of Classification Search
None
See application file for complete search history.

(56) References Cited

U.S. PATENT DOCUMENTS 6,434,555 B1 * 8/2002 Frolund .............. G06F 11/1474
7,917,470 B2   3/2011 Barnes et al.
(Continued)

FOREIGN PATENT DOCUMENTS

CN      101853186 A    10/2010
EP      1417558 B1     3/2012
WO      2007130698 A2  11/2007

OTHER PUBLICATIONS

The Open Group, "Distributed Transaction Processing: The XA Specification", Technical Standard, © Dec. 1991, X/Open Company Limited.
(Continued)

*Primary Examiner* — Yolanda L Wilson
(74) *Attorney, Agent, or Firm* — Isaac J. Gooshaw (57) ABSTRACT

Embodiments of the present invention disclose a method for recovery of a two-phase commit transaction. A computer receives an end command prior to completing execution of a prepare command for a transaction identifier. The computer determines if a failure and restart occurred within a distributed data processing environment after a resource manager receives an end command. The computer responds to a determination that the failure and restart did occur within the distributed data processing environment by retrieving the first transaction identifier from a data store. The computer transmits a rollback command for the retrieved first transaction identifier to the resource manager.

20 Claims, 4 Drawing Sheets

Related U.S. Application Data continuation of application No. 14/260,569, filed on Apr. 24, 2014, now Pat. No. 9,361,190.

(51) Int. Cl.
*G06F 9/46* (2006.01)
*G06F 11/30* (2006.01)

(52) U.S. Cl.
CPC ...... *G06F 11/1438* (2013.01); *G06F 11/1469* (2013.01); *G06F 11/1474* (2013.01); *G06F 11/302* (2013.01); *G06F 11/3089* (2013.01); *G06F 2201/805* (2013.01); *G06F 2201/85* (2013.01); *G06F 2201/87* (2013.01)

(56) References Cited

U.S. PATENT DOCUMENTS

| | | | | |
|---|---|---|---|---|
| 8,650,272 | B2* | 2/2014 | Myers | G06F 11/0709 709/223 |
| 2003/0154423 | A1* | 8/2003 | Egolf | G06F 11/1474 714/15 |
| 2008/0320020 | A1 | 12/2008 | Ramidi | |
| 2009/0193280 | A1* | 7/2009 | Brooks | G06F 11/1474 713/400 |
| 2010/0169284 | A1 | 7/2010 | Walter et al. | |
| 2011/0078516 | A1* | 3/2011 | El-Kersh | G06F 9/466 714/48 |
| 2013/0151889 | A1* | 6/2013 | Markus | G06F 17/30351 714/6.11 |
| 2013/0246368 | A1 | 9/2013 | Parkinson et al. | |
| 2013/0246845 | A1* | 9/2013 | Parkinson | G06F 17/30289 714/16 |
| 2013/0304714 | A1 | 11/2013 | Lee et al. | |

OTHER PUBLICATIONS

"Distributed Transaction Processing: XA", Oracle TimesTen In-Memory Database C, Developer's Guide, 11g Release 2 (11.2.2), provided in search report dated Dec. 9, 2013, <http://docs.oracle.com/cd/E11882_01/timesten.112/e21637/xa_dtp.htm#TTCDV327>.
"XA and Oracle controlled Distributed Transactions", Oracle, An Oracle White Paper, Jun. 2010, pp. 1-27, <http://www.oracle.com/technetwork/products/clustering/overview/distributed-transactions-and-xa-163941.pdf>.
U.S. Appl. No. 14/260,569, entitled "Recovery of a Transaction After XA End", filed Apr. 24, 2014.
U.S. Appl. No. 14/552,971, entitled "Recovery of a Transaction After XA End", filed Nov. 25, 2014.
IBM Appendix P., "List of IBM Patents or Patent Applications to Be Treated as Related", Dated Jul. 31, 2017, 2 pages.

\* cited by examiner

RECOVERY OF A TRANSACTION AFTER XA END

BACKGROUND

The present invention relates generally to the field of distributed transaction processing, and more particularly to recovery of a two-phase commit transaction after failure.

Distributed data processing systems involving multiple resource managers in a single transaction use a two-phase commit protocol found in the XA Specification by The Open Group® to ensure that all resources either commit or rollback any particular transaction consistently. Examples of resources accessed by resource managers using the XA Specification include databases, application servers, message queues, and transactional caches. The act of transferring money from one bank account to a second bank account is an example of a two-phase commit transaction. The data processing system ensures that both actions of debiting money from the first account and of crediting money to the second account, happen either together or not at all. If one side of the transaction is unable to complete for any reason, then the XA protocol provides for rolling back the other transaction which may be ready to commit.

Application programs transmit transactional requests to a middleware transaction manager. The transaction manager coordinates transactions between resource managers using the two-phase commit protocol of the XA Specification. The transaction manager controls the transaction globally, indicating to each resource manager what action is being requested, and when to perform the requested action. The transaction manager allows the completion of a transaction between separate resource managers which may physically reside on different software platforms, as well as separate computers. In the first phase of a two-phase commit, the transaction manager tells each resource to "prepare" to commit by performing all operations for a transaction and being ready to either make the changes permanent (commit) or to undo all the changes (rollback). Each resource manager responds back to the transaction manager indicating whether the operations succeeded or failed. In the second phase, if all operations succeeded, the transaction manager tells all resources to commit the changes. If at least one operation fails, then the transaction manager tells all resources to rollback the changes and indicates a transaction failure to the requesting application program.

SUMMARY

Embodiments of the present invention disclose a method, computer program product, and system for recovery of a two-phase commit transaction. A computer receives an end command prior to completing execution of a prepare command for a first transaction identifier. The computer determines if a failure and restart occurred within a distributed data processing environment after a resource manager receives an end command. The computer responds to a determination that the failure and restart did occur within the distributed data processing environment by retrieving the first transaction identifier from a data store. The computer transmits a rollback command for the retrieved first transaction identifier to the resource manager.

DETAILED DESCRIPTION

Distributed data processing systems use a two-phase commit protocol to ensure that transactions involving two or more resources either commit or rollback a particular transaction together. An application relies on a transaction manager (TM) to coordinate the work of a specific transaction known by a unique transaction identifier between each resource manager (RM) involved. Two-phase commit protocols are described by specifications which outline rules for processing of transactions, and outline recovery plans for a failure and restart of a distributed data processing system. Embodiments of the present invention provide for recovery of a two-phase commit transaction after a failure and restart of the distributed data processing system. Embodiments included in the present disclosure are described as utilizing the XA Specification by The Open Group®. However, the use of XA Specification herein is for ease of understanding only and as such is not to be interpreted as a limitation. As such, ones skilled in the art recognize that the distributed data processing systems that utilize two-phase commit protocols may be governed by other specifications and their associated commands and are therefore included within the limits of this disclosure.

Per the XA Specification, a transaction starts with the transaction manager sending an XA Start command and a transaction identifier (herein denoted as an "XID"), to each resource manager describing the unit of work the resource manager needs to perform. At the end of the work description, the transaction manager sends an XA End command to each resource manager. Subsequently, the transaction manager sends an XA Prepare command to each resource manager requesting the resource manager to determine if the work can be completed properly, and to send a "YES" or "NO" response back to the transaction manager. After a resource manager determines a response, the XID and response information is added to a resource manager log for that resource manager while also sending the response to the transaction manager. If all resource managers respond "YES" to a specific XID, then the transaction manager sends an XA Commit to each resource manager requesting the transaction work be completed and made visible to all resources. If at least one resource manager responds "NO" to a specific XID, then the transaction manager sends an XA Rollback command to each resource manager, and the transaction work is rolled back to the previous state and discarded.

In the case of a transaction manager or resource manager failure and restart, the XA Specification provides for recovery of a transaction if at least one resource manager responded to an XA Prepare command, and logged the transaction XID in the resource manager log. Embodiments of the present invention recognize that the XA Specification does not provide for recovery of a transaction if a resource manager received an XA End command for a transaction, but did not complete an XA Prepare command, and did not log the transaction XID in the resource manager log. If the XID was not logged by a resource manager, then after a restart the XID is no longer recoverable, and partial transaction fragments may be locked away and hidden from the transaction manager, tying up valuable resources. Embodiments of the present invention provide for a method for recovering from a failure and restart of the transaction manager or a resource manager, wherein the transaction manager stores a copy of the subsequent XID to be processed before issuing an XA Start command for the subsequent transaction. In such embodiments, if the XID is not available from any resource manager log after a failure and restart, then the stored copy of the XID is used by the transaction manager to issue an XA Rollback of that XID to all resource managers.

Embodiments of the present invention recognize that solutions to the recovery issue outlined above maintain the capability of working with a resource manager which is strictly compliant to the XA Specification. Embodiments of the present invention provide for customization of the transaction manager without customization of the two or more resource managers. Embodiments of the present invention also recognize that solutions to the recovery issue, capable of operating quickly after a failure and restart, offer a competitive edge amongst competitors using default timeout periods which tie-up valuable resources, such as temporarily lost system messages, fragments of banking transactions, and wasted processing time. For example, in the case of a stock exchange, delays of hours in transacting trades due to resource failures may be costly to customers relying on the timeliness of the transactions. Implementation of embodiments of the invention may take a variety of forms, and exemplary implementation details are discussed subsequently with reference to the figures.

Figure 1:
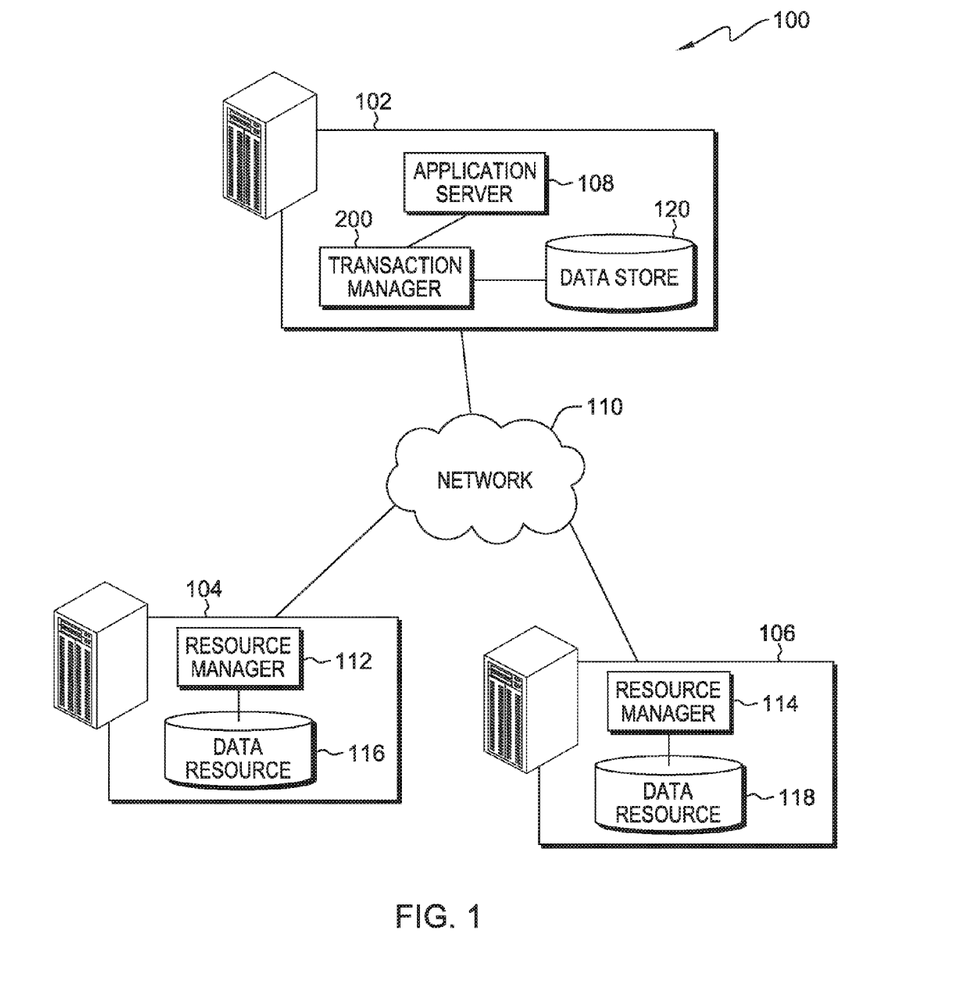
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. Distributed data processing environment 100 includes server computers 102, 104, and 106, interconnected over network 110. Distributed data processing environment 100 may include additional server computers, client computers, or other devices not shown.

Network 110 can be, for example, a local area network (LAN), a wide area network (WAN) such as the Internet, or a combination of the two, and can include wired, wireless, fiber optic, or any other connection known in the art. In general, network 110 can be any combination of connections and protocols that may support communications between server computers 102, 104, and 106, in accordance with an embodiment of the present invention.

Server computers 102, 104, and 106, can each respectively be a server computer, an application server, a laptop computer, a tablet computer, a netbook computer, a personal computer (PC), a desktop computer, a personal digital assistant (PDA), a smart phone, or any programmable electronic device capable of communicating with the remaining server computers via network 110. In certain embodiments, server computers 102, 104, and 106 can each respectively represent a computer system utilizing clustered computers and components that act as a single pool of seamless resources when accessed through network 110, as is common in data centers and with cloud computing applications.

Server computers 102, 104, and 106 may each be a node in a distributed database management environment. In general, server computers 102, 104, and 106 can each respectively be representative of any computing device or a combination of devices with respective access to application server 108, transaction manager 200, resource managers 112 and 114, data resources 116 and 118, and data store 120, and are capable of executing application server 108, transaction manager 200, and resource managers 112, and 114. Server computers 102, 104, and 106 may each include internal and external hardware components, as depicted and described in further detail with respect to FIG. 4.

In other embodiments of the present invention, application server 108, transaction manager 200, resource managers 112 and 114, data resources 116 and 118, and data store 120, may be on one computer, or more than one computer, and each item itself may be split into a plurality of parts or modules and spread across more than one computer. In any configuration, the following is maintained: application server 108 may communicate with transaction manager 200; transaction manager 200 may communicate with resource managers 112 and 114, and data store 120; and resource managers 112 and 114 may communicate with data resources 116 and 118, respectively.

Server computer 102 includes an instance of application server 108, and transaction manager 200. In the depicted environment, application server 108 may be a suite of applications requiring the use of two-phase commit transaction processing, such as banking software, or messaging applications. Transaction manager 200 is middleware that allows a developer to specify the requirements for performing two-phase commit transaction processing per the XA Specification between data resource manager applications. Transaction manager 200 provides the application programming interfaces (API) that enable application server 108 to issue commands for manipulating data within repositories, such as data resources 116 and 118. In other embodiments, application server 108, and transaction manager 200 may be on more than one computer, and each item may be split into a plurality of parts or modules and spread across more than one computer. In any configuration, the following is maintained: application server 108 communicates with transaction manager 200. Transaction manager 200 is described further in FIGS. 2 and 3.

Server computer 102 includes an instance of data store 120. Data store 120 is a data repository or database capable of storing data to be used after a failure and restart of server computers 102, 104 and 106, of transaction manager 200, or of resource managers 112 or 114. Embodiments of the present invention provide for transaction manager 200 storing, retrieving, and deleting a value for one or more transaction identifiers, or XIDs, in data store 120 at different times during transaction processing. Per the XA Specification, an XID may be defined by 128 bits of data which comprise information including, but not limited to, identification of the software product creating the XID, the ID of the machine creating the XID, a date/timestamp, and a sequence number used to ensure the uniqueness of each XID. Data store 120 may be including, but not limited to, a database connected to transaction manager 200, a database connected to resource manager 112 or resource manager 114, a message in a messaging queue, a memory location of server computer 102, a storage device connected to server computer 102, or any other device capable of data storage in communication with transaction manager 200.

Server computers 104 and 106 respectively include an instance of resource manager 112 and resource manager 114.

In the depicted environment, resource managers 112 and 114 may each be a suite of applications managing a data resource, such as a database or message queue. For example, resource manager 112 may be a Database Management System (DBMS) for controlling data resource 116. Resource managers 112 and 114 are data-related applications that perform two-phase commit transaction processing per the XA Specification based on commands received from transaction manager 200. Resource managers 112 and 114 provide the application programming interfaces (API) that enable transaction manager 200 to issue commands for transferring data, directly or indirectly, between or within data resources 116 and 118. Over network 110, resource managers 112 and 114 may each receive a command for a transaction from a requestor, such as transaction manager 200, process the command, send a response back to transaction manager 200, and perform any transaction associated with the received command. Server computers 104 and 106 are connected to the requestor, which may reside on server computer 102, via network 110. In other embodiments, resource managers 112 and 114 may each be on more than one computer, and may each respectively be split into a plurality of parts or modules and spread across more than one computer. In any configuration, the following is maintained: resource manager 112 communicates with data resource 116, and resource manager 114 communicates with data resource 118.

Server computers 104 and 106 respectively include an instance of data resource 116 and data resource 118. Data resources 116 and 118 each function as a data repository which may include one or more of the following: a relational database, a collection of related files, a collection of flat files, a comma-separated text file, a non-relational database, a hierarchical database, or a messaging queue. One skilled in the art will recognize that there may be many other types of data resources available for use by two-phase commit transaction processing tools.

In the illustrative embodiment of the present invention, transaction manager 200 coordinates two-phase commit transaction processing per the XA Specification between resource managers 112 and 114 associated with data resources 116 and 118, respectively. Each transaction, such as moving money from one bank account to another, is identified by a unique transaction identifier, or XID. In an embodiment of the present invention, transaction manager 200 stores an XID for the subsequent transaction to be processed in data store 120 before sending a start command, such as XA Start, for that transaction. Transaction manager 200 sends an XA Start command for the XID to resource managers 112 and 114 which describe the work to be performed. At the end of the work description, transaction manager 200 sends an XA End command to resource managers 112 and 114.

Transaction manager 200 sends a prepare command, such as XA Prepare, to resource managers 112 and 114 which requests each resource manager to determine if the work can be completed, and to send a "YES" or "NO" response back to transaction manager 200. After each one of resource managers 112 and 114 transmits a response to transaction manager 200, the XID is added to a resource manager log for each resource manager along with associated XID status information, such as "YES" or "NO". If both resource managers 112 and 114 respond "YES", then transaction manager 200 sends an XA Commit to resource managers 112 and 114 requesting that the transaction work be completed. If at least one of resource managers 112 or 114 responds "NO", then transaction manager 200 sends an XA Rollback command to resource managers 112 and 114, and the transaction work is discarded. Two-phase commit transaction rules utilize an "all or nothing" property or approach, such that either both resource managers 112 and 114 complete their work, or both resource managers 112 and 114 discard the work.

In embodiments of the present invention, transaction manager 200 removes the previously stored XID from data store 120 after the XA Prepare command has been processed, and the XID has been logged into at least one of the resource manager logs for resource managers 112 and 114. Transaction manager 200 stores the XID for the subsequent transaction to be processed into data store 120 sometime before finishing the current transaction and starting the subsequent transaction.

When a failure and restart happens to, at least one of, transaction manager 200, resource manager 112, or resource manager 114, then the XA Specification provides for recovery of a transaction if at least one of resource managers 112 and 114 previously responded to an XA Prepare command, and logged the transaction XID in the appropriate resource manager log. Transaction manager 200 sends a XA Recover command to resource managers 112 and 114. In response, resource managers 112 and 114 send a list of all XIDs in the resource manager logs that completed the XA Prepare step, but were never completed through an XA Commit or XA Rollback command. Transaction manager 200 compares the list of XIDs and their status from the resource manager log for each of resource managers 112 and 114. Transaction manager 200 determines an action, such as an XA Rollback or an XA Commit, to transmit to resource managers 112 and 114 based on the information in the logs. The XA Specification outlines standard recovery rules for XIDs which are listed in at least one resource manager's log.

Embodiments of the present invention provide for recovery of a transaction, wherein at least one of resource managers 112 and 114 received an XA End command for a transaction XID, but neither one of resource managers 112 or 114 responded to an XA Prepare command by logging the transaction XID in a resource manager log. After standard recovery rules are applied, transaction manager 200 then retrieves the stored copy, if one exists, of the XID from data store 120. Transaction manager 200 issues a rollback command, such as XA Rollback, of the retrieved XID to both resource managers 112 and 114. If a resource manager is holding a transaction fragment related to the XID, then the resource manager discards the information, rolls back any changes the resource manager may have made to a data resource, and sends a confirmation to transaction manager 200 indicating completion. If a resource manager does not have any information about the XID, then the resource manager sends an error message to transaction manager 200 indicating that the resource manager does not know anything about XID. Transaction manager 200 may be programmed to expect such an error code or message at this point in the recovery process, and ignore the error code or message.

For simplicity, the illustrative example comprises one transaction manager, and two resource managers, but one skilled in the art will recognize that there may be as few as one resource manager, or more than two resource managers controlled by any one transaction manager. Embodiments of the present invention do not limit the number of resource managers controlled by one transaction manager. Embodiments of the present invention recognize that given multiple resource managers under coordination of transaction manager 200, there may exist multiple transactions with XIDs being stored into data store 120 at any one time. The recovery plan after a failure is the same as above, but in such a case, an XA Rollback command is transmitted for all the XIDs stored in data store 120.

Figure 2:
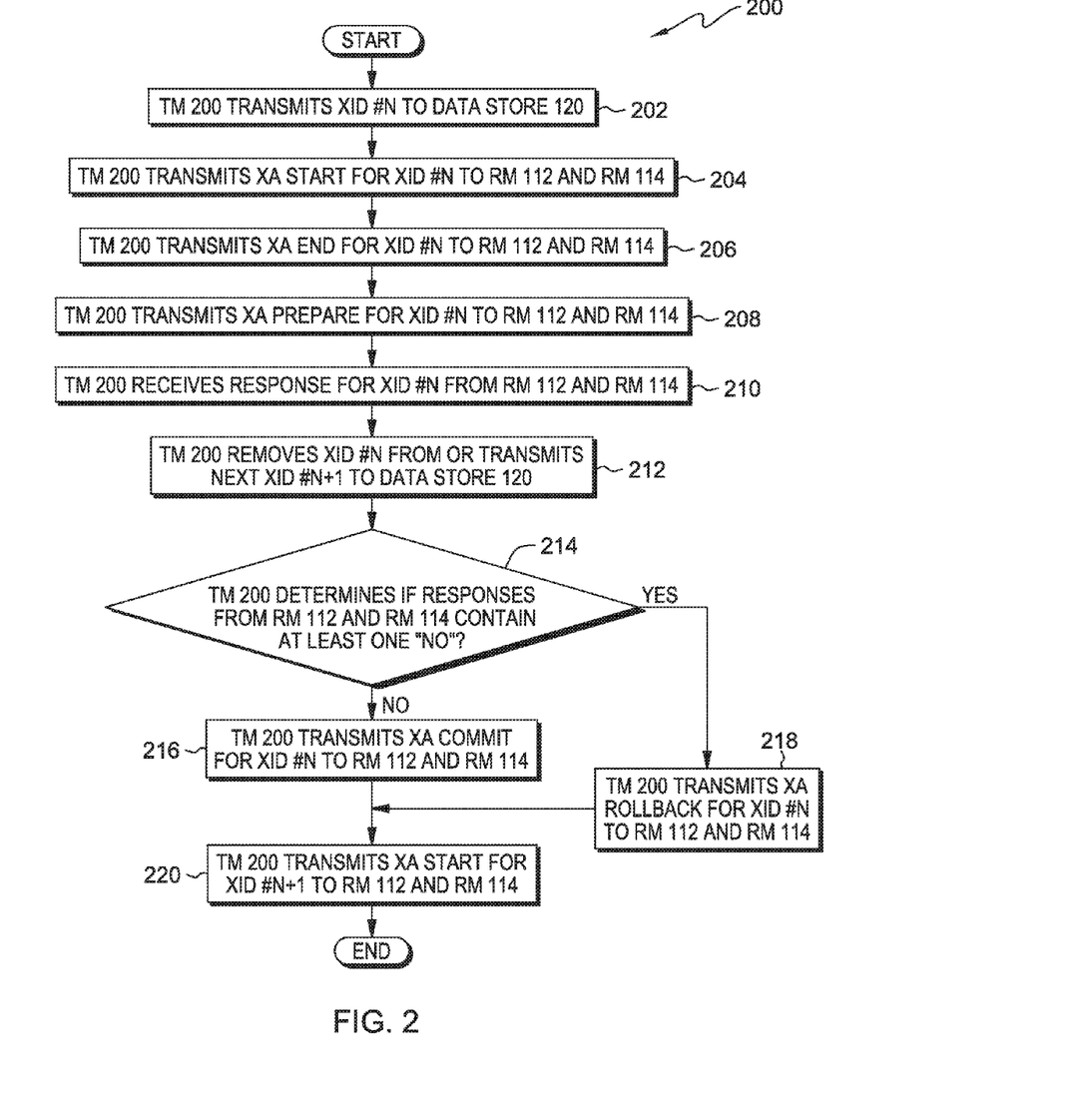
FIG. 2 is a flowchart depicting the operational steps of a transaction manager, on a server computer within the distributed data processing environment of FIG. 1, for the purpose of storing a transaction identifier, in accordance with an embodiment of the present invention.

FIG. 2 is a flowchart depicting the operational steps of transaction manager 200, on server computer 102 within distributed data processing environment 100 of FIG. 1, for the purpose of storing a transaction identifier, or XID, in accordance with an embodiment of the present invention. Transaction manager 200 (TM 200 in FIG. 2) residing on server computer 102 may communicate with resource manager 112 (RM 112 in FIG. 2) on server computer 104, and with resource manager 114 (RM 114 in FIG. 2) on server computer 106 via network 110.

Initially, transaction manager 200 receives a request to coordinate some task from application server 108. Transaction manager 200 determines that the received task breaks down into having resource manager 112 perform work item A, and having resource manager 114 perform work item B. Transaction manager 200 names the overall task with XID #N.

Transaction manager 200 transmits XID #N to data store 120 (step 202). Data store 120 protects XID #N from loss during a failure and restart of any part of distributed data processing environment 100. In various embodiments of the present invention, data store 120 may be a data storage device in communication with server computer 102. In alternate embodiments, data store 120 may be a record in a database connected to transaction manager 200, or to either resource manager 112 or resource manager 114. In another embodiment, data store 120 may be a message stored in a messaging queue. One skilled in the art will recognize that data store 120 may be any device capable of storing the transaction identifier, or XID, used in two-phase commit protocols.

Transaction manager 200 transmits an XA Start for XID #N to resource manager 112 and resource manager 114 (step 204). By transmitting the XA Start command to resource managers 112 and 114, transaction manager 200 indicates the start of the transmission of the details of the work items to each resource manager. Transaction manager 200 sends the details of work item A to resource manager 112, and sends the details of work item B to resource manager 114.

Transaction manager 200 transmits an XA End for XID #N to resource manager 112 and resource manager 114 (step 206). By transmitting the XA End command to resource managers 112 and 114, transaction manager 200 indicates the end of the transmission of the details of the work items for XID #N to each resource manager. Transaction manager 200 has completed sending all the details of the work to be completed for XID #N. Resource managers 112 and 114 may perform the work items, if able, although the results of the work are not yet visible to other resources of the system. For example, resource manager 112 may debit a bank account in data resource 116, and resource manager 114 may credit a bank account in data resource 118. The work is performed, but not committed yet. For example, the money being debited from data resource 116 is in a temporary state so that no other resource manager can request the same money before resource manager 112 has completed the transaction.

Transaction manager 200 transmits an XA Prepare for XID #N to resource manager 112 and resource manager 114 (step 208). By transmitting the XA Prepare command to resource managers 112 and 114, transaction manager 200 requests resource managers 112 and 114 to verify that the requested work items for XID #N may be completed. There are many reasons why a particular resource manager may not be able to complete a work item, including, but not limited to, equipment failure, insufficient resources, resource deadlock, or network outages. If resource manager 112 or resource manager 114 cannot complete the work item, then the respective resource manager transmits a "NO" to transaction manager 200. If resource manager 112 or resource manager 114 can complete the work item, then the respective resource manager transmits a "YES" to transaction manager 200. The responses may be received in another form, for example, "YES" may be an XA_OK. A "NO" may be received in various forms indicating the type of error involved, such as an XA_RBDEADLOCK. "YES" and "NO" are used for simplicity of illustration.

Transaction manager 200 receives a response for XID #N from resource manager 112 and resource manager 114 (step 210). Transaction manager 200 receives a "YES" OR "NO" response from each of resource managers 112 and 114 indicating if they are capable of completing the received work items. Resource managers 112 and 114 each log a "YES"/"NO" response, and the XID #N for the current transaction into a respective resource manager log. Each resource manager has a separate resource manager log comprising a list of one or more XIDs for transactions that have finished the XA Prepare command, and the "YES"/ "NO" response for each logged XID.

Transaction manager 200 removes XID #N from or transmits next XID #N+1 to data store 120 (step 212). Once the XID #N is logged into at least one of the resource manager logs for either resource manager 112 or resource manager 114, transaction manager 200 may remove the XID #N for the current transaction from data store 120. If another transaction has been received by transaction manager 200 from application server 108, then transaction manager 200 stores the XID #N+1 for the next transaction into data store 120. If another transaction has not been received by transaction manager 200, then data store 120 remains empty. In an alternate embodiment, step 212 may be performed between steps 216 and 220, or 218 and 220, such that the next XID #N+1 is transmitted to data store 120 prior to transmitting an XA Start command for XID #N+1.

Transaction manager 200 determines if responses from resource manager 112 and resource manager 114 contain at least one "NO" (decision 214). Responsive to receiving a response from both resource managers 112 and 114, transaction manager 200 determines if at least one "NO" was received from either of resource managers 112 or 114. If transaction manager 200 determines that the responses from resource manager 112 and resource manager 114 contain at least one "NO" (yes branch, decision 214), then transaction manager 200 transmits an XA Rollback for XID #N to both resource manager 112 and resource manager 114 (step 218). If either one or both of resource manager 112 or resource manager 114 respond to the XA Prepare command with a "NO", then the transaction should not proceed per the "all or nothing" property of the two-phase commit transaction protocol. To remove any changes to data resources 116 and 118 that may have been performed, but are not visible to other resources, transaction manager 200 transmits an XA Rollback command for the current XID #N to both resource managers 112 and 114. Responsive to receiving the XA Rollback command from transaction manager 200, each of resource managers 112 and 114 can undo the work items received between steps 204 and 206, and throw away all information regarding the work items and transaction XID #N. Upon rollback, information for XID #N can either be removed from the respective resource manager logs, or listed as "completed" and retained for purposes of debugging. A transaction is considered "completed" after either a XA Rollback or a XA Commit is performed, as both are acceptable outcomes to a transaction considering the "all or nothing" property of the two-phase commit transaction protocol.

If transaction manager 200 determines that responses from resource manager 112 and resource manager 114 do not contain at least one "NO" (no branch, decision 214), then transaction manager 200 transmits an XA Commit for XID #N to both resource manager 112 and resource manager 114 (step 216). If both resource managers 112 and 114 respond to the XA Prepare command with a "YES", then all resource managers are able to perform the work, and to make the changes permanent. Responsive to receiving the XA Commit command from transaction manager 200, each of resource managers 112 and 114 can complete the work items for the current XID #N, and make the performed changes permanent and visible to other resources. Upon commit, information for XID #N can either be removed from the respective resource manager logs, or listed as "completed" and retained for purposes of debugging.

After either an XA Commit (step 216) or an XA Rollback (step 218), transaction manager 200 transmits an XA Start for XID #N+1 to resource manager 112 and resource manager 114 (step 220). The previous transaction for XID #N has completed processing, and the next XID #N+1 is ready to begin processing. By transmitting the XA Start command to resource managers 112 and 114, transaction manager 200 indicates the start of the transmission of the details of the work items for XID #N+1. For example, a transaction with XID #N+1 may comprise work item C, and work item D. Transaction manager 200 sends the details of work item C to resource manager 112, and sends the details of work item D to resource manager 114.

Step 220 starts the processing of XID #N+1, which is similar to step 204 for the previous XID #N. Steps 204, 206, 208, 210, 212, 214, 216 or 218, and 220 may repeat until transaction manager 200 has completed coordinating all current transaction requests, or until some failure of the system.

Figure 3:
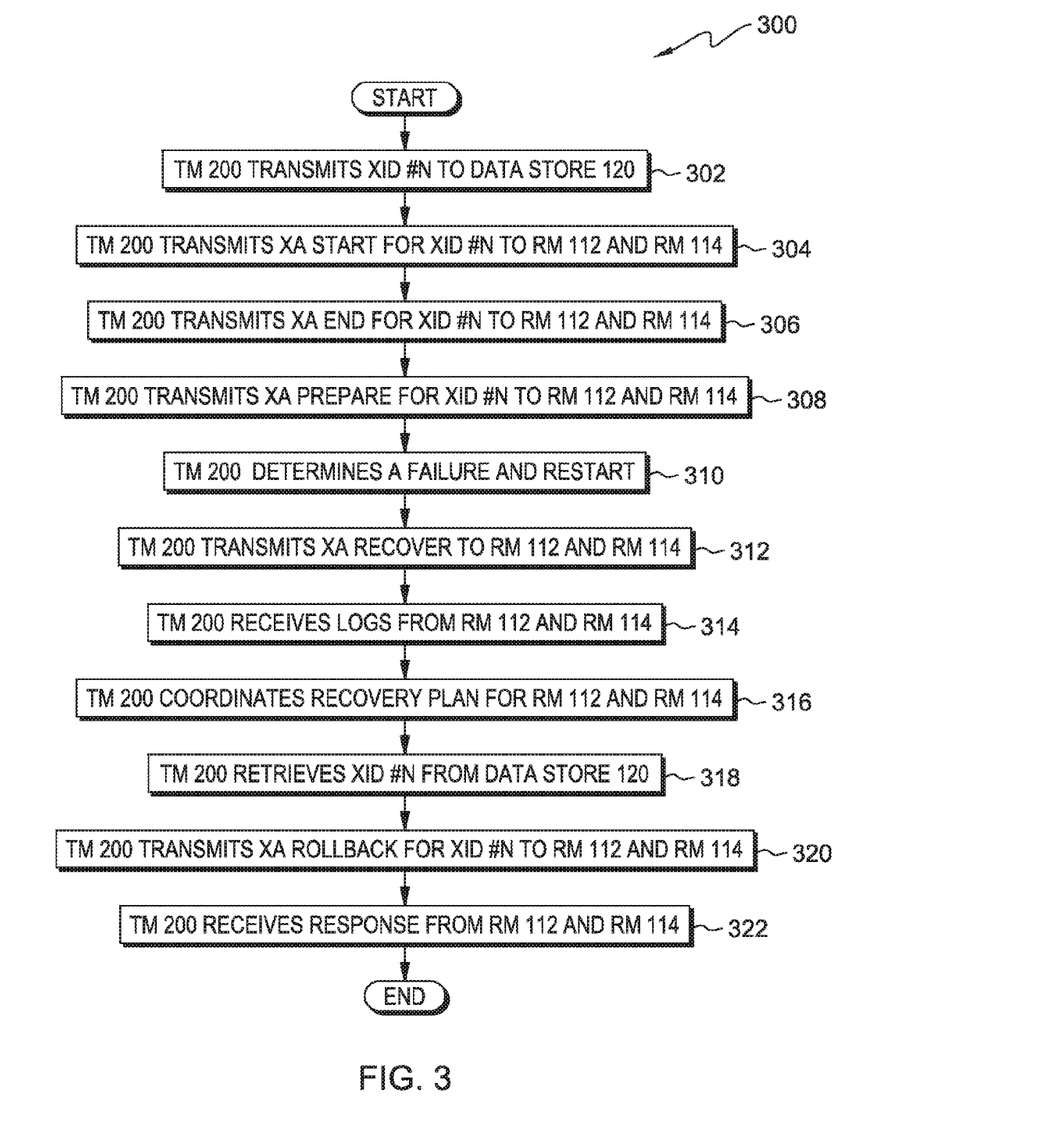
FIG. 3 is a flowchart depicting the operational steps of a transaction manager after a failure and restart, on a server computer within the distributed data processing environment of FIG. 1, for the purpose of recovering an incomplete two-phase commit transaction, in accordance with an embodiment of the present invention.

FIG. 3 is a flowchart depicting the operational steps of transaction manager 200 after a failure and restart using flow 300, on server computer 102 within distributed data processing environment 100 of FIG. 1, for the purpose of recovering an incomplete two-phase commit transaction, in accordance with an embodiment of the present invention. Transaction manager 200 (TM 200 in FIG. 3) residing on server computer 102 may communicate with resource manager 112 (RM 112 in FIG. 3) on server computer 104, and with resource manager 114 (RM 114 in FIG. 3) on server computer 106 via network 110.

Transaction manager 200 transmits XID #N to data store 120 (step 302). Transaction manager 200 transmits XID #N to data store 120 for the purpose of storing the XID in case of a system failure. One skilled in the art will recognize that data store 120 may be any device capable of storing a transaction identifier, or XID, used in two-phase commit protocols. Step 302 is the same as step 202 in FIG. 2.

Transaction manager 200 transmits an XA Start for XID #N to resource manager 112 and resource manager 114 (step 304). By transmitting the XA Start command to resource managers 112 and 114, transaction manager 200 indicates the start of the transmission of the details of the work items to each resource manager. Transaction manager 200 sends the details of work item A to resource manager 112, and sends the details of work item B to resource manager 114. Step 304 is the same as step 204 in FIG. 2.

Transaction manager 200 transmits an XA End for XID #N to resource manager 112 and resource manager 114 (step 306). By transmitting the XA End command to resource managers 112 and 114, transaction manager 200 indicates the end of the transmission of the details of the work items for XID #N to each resource manager. Transaction manager 200 has completed sending all the details of the work to be completed for XID #N. Resource managers 112 and 114 may perform the work items, if able, although the results of the work are not yet visible to other resources of the system. Step 306 is the same as step 206 in FIG. 2.

Transaction manager 200 transmits an XA Prepare for XID #N to resource manager 112 and resource manager 114 (step 308). By transmitting the XA Prepare command to resource managers 112 and 114, transaction manager 200 requests resource managers 112 and 114 to verify that the requested work items for XID #N may be completed. As mentioned before, there are many reasons why a particular resource manager may not be able to complete a work item. If resource manager 112 or resource manager 114 cannot complete the work item, then the respective resource manager transmits a "NO" to transaction manager 200. If resource manager 112 or resource manager 114 can complete the work item, then the respective resource manager transmits a "YES" to transaction manager 200. The responses may be received in another form, but "YES" and "NO" are used for simplicity of illustration. Step 308 is the same as step 208 in FIG. 2.

Transaction manager 200 determines a failure and restart (step 310) occurred. A failure in the distributed data processing environment 100 of FIG. 1, may occur at one or more of server computers 102, 104, and 106. A failure may involve hardware problems, such as power outages or failures, communication loss, network outage, or reboot. Software, such as transaction manager 200, resource manager 112, or resource manager 114 may fail in a program crash, and have to restart. Responsive to determining a failure and restart occurred, transaction manager 200 initially follows a recovery plan from the XA Specification.

Transaction manager 200 transmits an XA Recover to resource manager 112 and resource manager 114 (step 312). By transmitting the XA Recover command to resource managers 112 and 114, transaction manager 200 requests resource managers 112 and 114 to retrieve the respective resource manager log of one or more XIDs for transactions that have finished the XA Prepare command, and the associated "YES"/"NO" response for each logged XID.

Transaction manager 200 receives logs from resource manager 112 and resource manager 114 (step 314). In one embodiment, resource manager 112 retrieves a list of XIDs from the resource manager log which had a response for the XA Prepare command, and transmits the list of XIDs with associated responses to transaction manager 200. In another embodiment, resource manager 114 sends a copy of the resource manager log or a link to the log file to transaction manager 200. Each list or log includes a list of all logged XIDs, and the associated responses to the XA Prepare command for each XID in the list. Resource managers 112 and 114 transmit XIDs which have completed an XA Start command, an XA End command, and an XA Prepare command, but have not completed either an XA Commit command, or an XA Rollback command.

Transaction manager 200 coordinates recovery plan for resource manager 112 and resource manager 114 (step 316). Transaction manager 200 compares the list of XIDs and their statuses in the log for each of resource managers 112 and 114. Transaction manager 200 determines an action, such as an XA Rollback or an XA Commit, to transmit to resource managers 112 and 114 based, at least in part, on the information in the logs. The XA Specification outlines standard recovery rules for XIDs which are listed in at least one resource manager log.

Transaction manager 200 retrieves XID #N from data store 120 (step 318). After standard recovery rules are applied (in step 316), transaction manager 200 retrieves the stored copy (from step 302), if one exists, of XID #N from data store 120. Data store 120 may be a storage type unaffected by a failure and restart of the system. Embodiments of the present invention recognize that if XID #N was not logged in one of the resource manager logs before a failure and restart, then XID #N is no longer recoverable using standard recovery procedures in the XA Specification, and partial transaction fragments may be locked away and hidden from transaction manager 200, tying up valuable resources. Embodiments of the present invention provide for the recovery of XID #N by storing XID #N (in step 302), and then retrieving XID #N (in step 318) after a failure.

Transaction manager 200 transmits an XA Rollback for XID #N to resource manager 112 and resource manager 114 (step 320). Embodiments of the present invention provide for recovery of a transaction, such as XID #N, wherein at least one of resource managers 112 and 114 receives an XA End command for XID #N, but neither one of resource managers 112 and 114 responds to an XA Prepare command by logging transaction XID #N in a resource log. Transaction manager 200 issues an XA Rollback command of the retrieved XID #N to both resource managers 112 and 114.

Transaction manager 200 receives a response from resource manager 112 and resource manager 114 (step 322). Transaction manager 200 receives a response indicating success or failure of the XA Rollback command from each of resource manager 112 and resource manager 114. For example, if resource manager 112 has a transaction fragment locked away related to XID #N, then resource manager 112 discards the transaction information while rolling back any changes resource manager 112 may have made to data resource 116, and sends a response to transaction manager 200 indicating success of the XA Rollback command. In another example, if resource manager 114 does not identify any information about XID #N in the resource manager log, then resource manager 114 sends an error code or message to transaction manager 200. The error code may indicate failure of resource manager 114 to identify information related to the retrieved transaction identifier, or XID #N, while executing the XA Rollback command. Transaction manager 200 may be programmed to expect such an error message at this point in the recovery process, and may be programmed to not respond to the error message.

At this point, the recovery is complete and all transaction fragments are discarded.

For simplicity, the illustrative example comprises one transaction manager, and two resource managers, but one skilled in the art will recognize that there may be more than two resource managers controlled by the transaction manager. Embodiments of the present invention would provide for transaction manager 200 sending the XA Rollback command for XID #N to all resource managers controlled by transaction manager 200.

Figure 4:
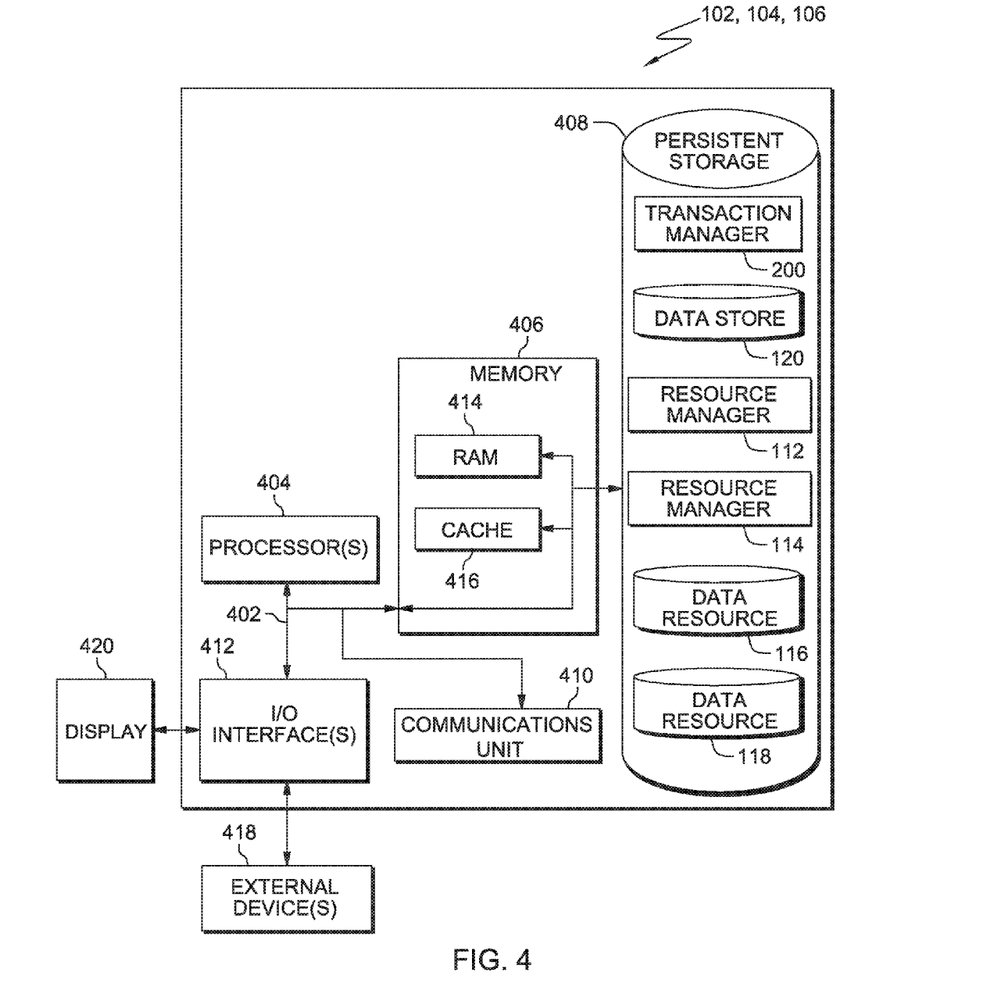
FIG. 4 depicts a block diagram of components of an exemplary computer system for implementing embodiments of the present invention.

FIG. 4 depicts a block diagram of respective components of server computers 102, 104, and 106 in accordance with an illustrative embodiment of the present invention. It may be appreciated that FIG. 4 provides only an illustration of one implementation and does not imply any limitations with regard to the environments in which different embodiments may be implemented. Many modifications to the depicted environment may be made.

Server computers 102, 104, and 106, may each include respective communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Application server 108, transaction manager 200, resource managers 112 and 114, data resources 116 and 118, and data store 120 are stored in respective persistent storage 408 for execution and/or access by one or more of the further respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computers 102, 104, and 106. In these examples, communications unit 410 includes one or more network interface cards. Communications unit 410 may provide communications through the use of either or both physical and wireless communications links. Application server 108, transaction manager 200, resource managers 112 and 114, data resources 116 and 118, and data store 120, may be downloaded to respective persistent storage 408 through communications unit 410.

I/O interface(s) 412 allows for input and output of data with other devices that may be connected to server computers 102, 104, and 106. For example, I/O interface 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., application server 108, transaction manager 200, resource managers 112 and 114, data resources 116 and 118, and data store 120, can be stored on such portable computer readable storage media and can be loaded onto respective persistent storage 408 via I/O interface(s) 412. I/O interface(s) 412 also connect to a display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for recovery of a two-phase commit transaction, the method comprising:
a computer receiving an end command prior to completing execution of a prepare command for a first transaction identifier;
the computer determining if a failure and restart occurred within a distributed data processing environment after a resource manager receives an end command;
responsive to determining that the failure and restart did occur within the distributed data processing environment, the computer retrieving the first transaction identifier from a data store; and
the computer transmitting a rollback command for the retrieved first transaction identifier to the resource manager.

2. The method of claim 1, comprising:
a computer transmitting a first transaction identifier to a data store, wherein the first transaction identifier defines a two-phase commit transaction; and
the computer transmitting a prepare command for the first transaction identifier to a resource manager.

3. The method of claim 1, comprising:
responsive to determining that the failure and restart did not occur within the distributed data processing environment, the computer (i) deleting the first transaction identifier from the data store, and (ii) transmitting a second transaction identifier to the data store prior to the computer transmitting a start command for the second transaction identifier; and
the computer transmitting the start command for the second transaction identifier to the resource manager.

4. The method of claim 1, comprising:
responsive to determining the failure and restart did occur within the distributed data processing environment, the computer transmitting a recover command to the resource manager prior to the computer transmitting the rollback command;
the computer receiving a response from the resource manager comprising (i) at least one transaction identifier and (ii) a related status of the at least one transaction identifier that is based on a log of the resource manager; and
the computer transmitting a command for transaction processing for the at least one transaction identifier based, at least in part, on one or both of (i) recovery rules in a specification for coordination of two-phase commit transactions and (ii) the related status.

5. The method of claim 1, comprising:
the computer receiving a response from the resource manager after transmission of the rollback command; and
the computer determining if the received response comprises an error code, wherein the error code indicates failure of the resource manager to identify information related to the retrieved first transaction identifier while executing the rollback command.

6. The method of claim 1, comprising:
the computer receiving a response from the resource manager after transmission of the rollback command; and
the computer determining if the received response comprises a confirmation that the resource manager identified and discarded information related to the retrieved first transaction identifier while executing the rollback command.

7. The method of claim 1, wherein the rollback command for the retrieved first transaction identifier comprises at least one resource manager which is compliant to an XA Specification for coordination of the two-phase commit transaction.

8. The method of claim 1, wherein the failure and restart occurred within the distributed data processing environment due to one or more of the following: a power outage, a power failure, a communication loss, a network outage, a hardware reboot, a software crash, and a software reboot.

9. A computer program product for recovery of a two-phase commit transaction, the computer program product comprising:
a computer readable storage medium and program instructions stored on the computer readable storage medium, the program instructions comprising:
program instructions to receive an end command prior to completing execution of a prepare command for a first transaction identifier;
program instructions to determine if a failure and restart occurred within a distributed data processing environment after a resource manager receives an end command;
program instructions to respond to a determination that the failure and restart did occur within the distributed data processing environment, by retrieving the first transaction identifier from a data store; and
program instructions to transmit a rollback command for the retrieved first transaction identifier to the resource manager.

10. The computer program product of claim 9, comprising:
program instructions to transmit a first transaction identifier to a data store, wherein the first transaction identifier defines a two-phase commit;
program instructions to transmit a prepare command for the first transaction identifier to a resource manager.

11. The computer program product of claim 9, comprising:
program instructions to respond to a determination that the failure and restart did not occur within the distributed data processing environment, by (i) deleting the first transaction identifier from the data store, and (ii) transmitting a second transaction identifier to the data store prior to transmitting a start command for the second transaction identifier; and
program instructions to transmit the start command for the second transaction identifier to the resource manager.

12. The computer program product of claim 9, comprising:
program instructions to respond to a determination that the failure and restart did occur within the distributed data processing environment by transmitting a recover command to the resource manager prior to the computer transmitting the rollback command;
program instructions to receive a response from the resource manager comprising (i) at least one transaction identifier and (ii) a related status of the at least one transaction identifier that is based on a log of the resource manager; and program instructions to transmit a command for transaction processing for the at least one transaction identifier based, at least in part, on one or both of (i) recovery rules in a specification for coordination of two-phase commit transactions and (ii) the related status.

13. The computer program product of claim 9, comprising:

program instructions to receive a response from the resource manager after transmission of the rollback command; and program instructions to determine if the received response comprises an error code that indicates a failure of the resource manager to identify information related to the retrieved first transaction identifier while executing the rollback command.

14. The computer program product of claim 9, comprising:

program instructions to receive a response from the resource manager after transmission of the rollback command; and program instructions to determine if the received response includes a confirmation that the resource manager identified and discarded information related to the retrieved first transaction identifier while executing the rollback command.

15. The computer program product of claim 9, wherein the rollback command for the retrieved first transaction identifier comprises at least one resource manager which is compliant to an XA Specification for coordination of the two-phase commit transaction.

16. The computer program product of claim 9, wherein the failure and restart occurred within the distributed data processing environment due to one or more of the following: a power outage, a power failure, a communication loss, a network outage, a hardware reboot, a software crash, and a software reboot.

17. A computer system for recovery of a two-phase commit transaction, the computer system comprising:

one or more computer processors;

one or more computer readable storage media;

program instructions stored on the computer readable storage media for execution by at least one of the one or more processors, the program instructions comprising:

program instructions to receive an end command prior to completing execution of a prepare command for a first transaction identifier;

program instructions to determine if a failure and restart occurred within a distributed data processing environment after a resource manager receives an end command;

program instructions to respond to a determination that the failure and restart did occur within the distributed data processing environment, by retrieving the first transaction identifier from a data store; and program instructions to transmit a rollback command for the retrieved first transaction identifier to the resource manager.

18. The computer system of claim 17, comprising:

program instructions to transmit a first transaction identifier to a data store, wherein the first transaction identifier defines a two-phase commit;

program instructions to transmit a prepare command for the first transaction identifier to a resource manager.

19. The computer system of claim 17, comprising:

program instructions to respond to a determination that the failure and restart did not occur within the distributed data processing environment, by (i) deleting the first transaction identifier from the data store, and (ii) transmitting a second transaction identifier to the data store prior to transmitting a start command for the second transaction identifier; and program instructions to transmit the start command for the second transaction identifier to the resource manager.

20. The computer system of claim 17, comprising:

program instructions to respond to a determination that the failure and restart did occur within the distributed data processing environment by transmitting a recover command to the resource manager prior to the computer transmitting the rollback command;

program instructions to receive a response from the resource manager comprising (i) at least one transaction identifier and (ii) a related status of the at least one transaction identifier that is based on a log of the resource manager; and program instructions to transmit a command for transaction processing for the at least one transaction identifier based, at least in part, on one or both of (i) recovery rules in a specification for coordination of two-phase commit transactions and (ii) the related status.

* * * * *